US010933581B2

(12) United States Patent
Hopkinson et al.

(10) Patent No.: US 10,933,581 B2
(45) Date of Patent: Mar. 2, 2021

(54) METHODS AND APPARATUS FOR SELECTIVELY COMBINING PARTICULATE MATERIAL

(75) Inventors: Neil Hopkinson, Sheffield (GB); Helen Rhiannon Thomas, Nottingham (GB)

(73) Assignee: Loughborough University, Leicestershire (GB)

(*) Notice: Subject to any disclaimer, the term of this patent is extended or adjusted under 35 U.S.C. 154(b) by 1504 days.

(21) Appl. No.: 14/237,160

(22) PCT Filed: Aug. 1, 2012

(86) PCT No.: PCT/GB2012/051866
§ 371 (c)(1),
(2), (4) Date: Jul. 11, 2014

(87) PCT Pub. No.: WO2013/021173
PCT Pub. Date: Feb. 14, 2013

(65) Prior Publication Data
US 2014/0314613 A1    Oct. 23, 2014

(30) Foreign Application Priority Data

Aug. 5, 2011 (GB) .................................. 1113612

(51) Int. Cl.
*B22F 3/00* (2006.01)
*B29C 64/153* (2017.01)
(Continued)

(52) U.S. Cl.
CPC ............ *B29C 64/153* (2017.08); *B22F 3/003* (2013.01); *B22F 10/20* (2021.01); *B29C 64/295* (2017.08);
(Continued)

(58) Field of Classification Search
CPC ............................... B22F 3/008; B22F 3/1055
See application file for complete search history.

(56) References Cited

U.S. PATENT DOCUMENTS 5,527,877 A    6/1996 Dickens, Jr. et al.
5,908,569 A    6/1999 Wilkening et al.
(Continued)

FOREIGN PATENT DOCUMENTS

CN    101479064       8/2011
EP    1707341 A1    11/2005
(Continued)

OTHER PUBLICATIONS

The Great Britain Exam Report dated Oct. 12, 2015 for GB patent application No. GB1113612.4, a counterpart foreign application of U.S. Appl. No. 14/237,160, 1 page. counterpart.
(Continued)

*Primary Examiner* — Christopher S Kessler
(74) *Attorney, Agent, or Firm* — Lee & Hayes, P.C.

(57) ABSTRACT

A method of selectively combining particulate material, comprising: (i) providing a layer of particulate material to a part bed; (ii) providing radiation to sinter a portion of the material of the layer; (iii) providing a further layer of particulate material overlying the prior layer of particulate material including the previously sintered portion of material; (iv) providing radiation to sinter a further portion of the material within the overlying further layer and to sinter said further portion with the previously sintered portion of material in the prior layer; (v) successively repeating blocks (iii) and (iv) to form a three-dimensional object; and wherein at least some of the layers of particulate material are pre-heated with a heater prior to sintering a portion of the material of the respective layer, the heater being configured to move relative to, and proximate, the particulate material.

11 Claims, 9 Drawing Sheets

(51) Int. Cl.
  *B33Y 10/00* (2015.01)
  *B33Y 30/00* (2015.01)
  *B29C 64/393* (2017.01)
  *B33Y 40/00* (2020.01)
  *B33Y 50/02* (2015.01)
  *B29C 64/295* (2017.01)
  *B22F 10/20* (2021.01)
  *B29C 35/08* (2006.01)
  *B22F 10/10* (2021.01)

(52) U.S. Cl.
  CPC ............ *B29C 64/393* (2017.08); *B33Y 10/00* (2014.12); *B33Y 30/00* (2014.12); *B33Y 40/00* (2014.12); *B33Y 50/02* (2014.12); *B22F 10/10* (2021.01); *B29C 2035/0838* (2013.01); *Y02P 10/25* (2015.11)

(56) References Cited

U.S. PATENT DOCUMENTS

| | | | |
|---|---|---|---|
| 6,007,764 | A | 12/1999 | Benda et al. |
| 6,217,816 | B1 | 4/2001 | Tang |
| 7,879,282 | B2 | 2/2011 | Hopkinson et al. |
| 8,535,036 | B2 | 9/2013 | Hopkinson et al. |
| 2004/0104499 | A1 | 6/2004 | Keller |
| 2006/0180957 | A1* | 8/2006 | Hopkinson ............ B29C 67/02 264/405 |
| 2007/0238056 | A1 | 10/2007 | Baumann et al. |
| 2009/0068376 | A1 | 3/2009 | Philippi et al. |
| 2011/0190904 | A1 | 8/2011 | Lechmann et al. |

FOREIGN PATENT DOCUMENTS

| | | |
|---|---|---|
| EP | 1600281 A1 | 4/2006 |
| JP | 2007533480 | 11/2007 |
| JP | 2007534524 | 11/2007 |
| WO | WO2005011959 | 2/2005 |
| WO | WO2005105412 | 11/2005 |
| WO | WO2008013483 A1 | 1/2008 |
| WO | WO2011045291 | 4/2011 |

OTHER PUBLICATIONS

The Korean Office Action dated Sep. 10, 2015 for Korean patent application No. 7005888, a counterpart foreign application of U.S. Appl. No. 14/237,160, 8 pages.

The Chinese Office Action dated Jul. 7, 2015 for Chinese patent application No. 2012800490052, a counterpart foreign application of U.S. Appl. No. 14/237,160, 9 pages.

Japanese Office Action dated Sep. 3, 2019 for Japanese patent application No. 2018-156990, a counterpart foreign application of U.S. Appl. No. 14/237,160, 15 pages.

* cited by examiner

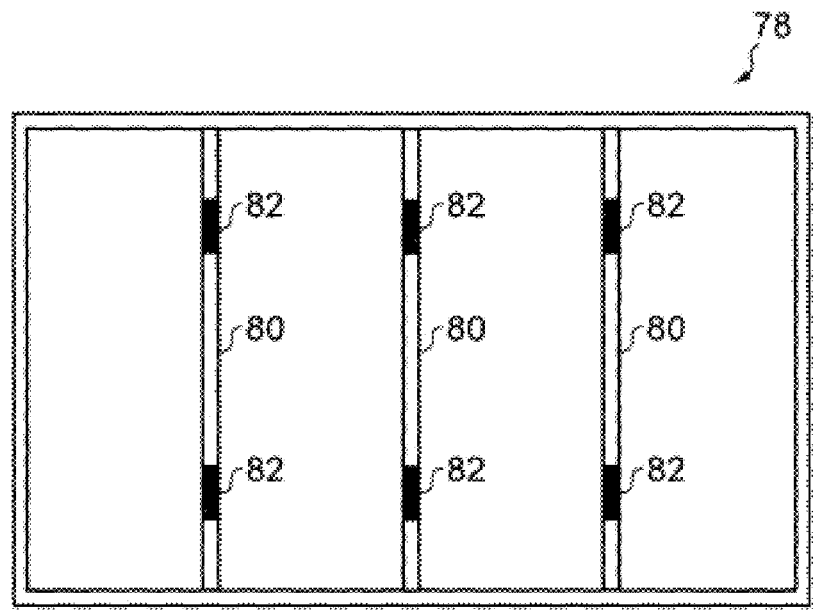
FIG. 14
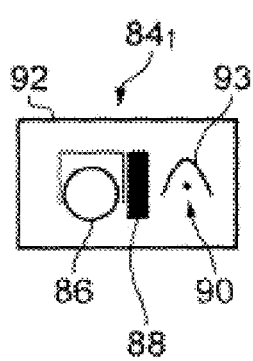 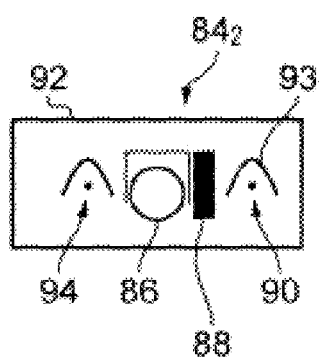 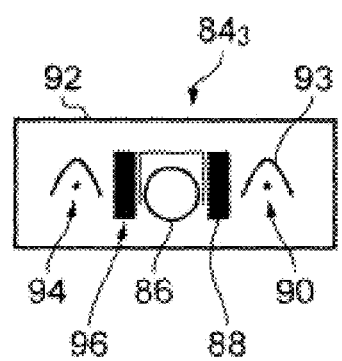
FIG. 15A     FIG. 15B     FIG. 15C

METHODS AND APPARATUS FOR SELECTIVELY COMBINING PARTICULATE MATERIAL

This Application is the U.S. National Stage of and claims priority to Patent Cooperation Treaty International Application Serial No. PCT/GB2012/051866, filed Aug. 1, 2012, entitled "Methods and Apparatus for Selectively Combining Particulate Material," which is incorporated herein by reference, and this Application claims priority to GB Patent Application Serial, No. 1113612.4, filed Aug. 5, 2011, entitled "Methods and apparatus for selectively combining particulate material" each of which is incorporated herein by reference.

TECHNOLOGICAL FIELD

Embodiments of the present invention relate to methods and apparatus for selectively combining particulate material.

BACKGROUND

Rapid Prototyping is widely used to form prototype components, and a number of apparatus and methods are currently available for carrying out rapid prototyping. In one method, a computer generated three dimensional model of the component is initially produced using computer assisted drawing (CAD) software. The three dimensional model is then sliced into a number of virtual layers, and a device is then used to form the layers from particulate material and sinter the layers to create the three dimensional object.

When forming a three dimensional object, the particulate material usually needs to be relatively cool in order to flow smoothly and be reliably and evenly deposited onto the build surface. If the particulate material is too hot when being deposited, it will flow poorly and can cause build failure or poor part quality. However once deposited, the powder, if is too cool, can cause the underlying sintered material in the previous layer to cool below a temperature at which it will curl upwards and thus prevent progress of the build.

It would therefore be desirable to provide an alternative method and apparatus for selectively combining particulate material.

BRIEF SUMMARY

According to various, but not necessarily all, embodiments of the invention there is provided a method of selectively combining particulate material, comprising: (i) providing a layer of particulate material to a part bed; (ii) providing radiation to sinter a portion of the material of the layer; (iii) providing a further layer of particulate material overlying the prior layer of particulate material including the previously sintered portion of material; (iv) providing radiation to sinter a further portion of the material within the overlying further layer and to sinter said further portion with the previously sintered portion of material in the prior layer; (v) successively repeating blocks (iii) and (iv) to form a three-dimensional object; and wherein at least some of the layers of particulate material are pre-heated with a heater prior to sintering a portion of the material of the respective layer, the heater being configured to move relative to, and proximate, the particulate material.

The heater may be configured to move within 100 mm of the particulate material.

The heater may be arranged to heat at least some of the layers of particulate material to prevent at least one underlying layer of particulate material from cooling to a temperature at which it curls.

A source of radiation for providing the radiation may comprise a reflection device that defines an elliptical configuration.

The method may further comprise measuring a temperature of the particulate material; and controlling the pre-heating of the layers of particulate material using the measured temperature.

The heater may emit a range of wavelengths with a peak wavelength which is different to that of a radiation source for providing the radiation that initiates sintering.

The layers of particulate material may be substantially pre-heated by only the heater.

The method may further comprise determining a temperature of a sintered portion of the material and controlling energy provided to the sintered portion using the determined temperature.

If the determined temperature is less than a threshold temperature, the energy provided to the sintered portion may be increased.

If the determined temperature is greater than a threshold temperature, the energy provided to the sintered portion may be decreased.

A sensor may be used to determine the temperature of the sintered portion.

The sensor may be an infra-red camera, a single pyrometer or an array of pyrometers.

The method may further comprise determining output energy from a radiation source for providing the radiation and controlling the output of energy of the radiation source in response to the determined output energy.

A source of radiation for providing the radiation may be different to the heater.

The heater that pre-heats the layers of particulate material may comprise a source of radiation for providing the radiation.

A plurality of sources of radiation may be configured to provide radiation.

At least some of the plurality of sources of radiation may provide radiation having different peak wavelengths.

One or more filters may be configured to filter the radiation provided by at least some of the plurality of sources of radiation.

At least some of the plurality of sources of radiation may be individually controllable to provide radiation to the particulate material.

At least some of the plurality of sources of radiation may form the heater.

A support may be configured to receive the particulate material, the support comprising a plurality of walls, moveable relative to the support.

At least some of the plurality of walls may include a heater for heating the particulate material.

The method may further comprise providing a material to the particulate material to be sintered to change the properties of the particulate material to be sintered.

The method may further comprise: varying the absorption of provided radiation in block (ii) across a selected surface portion of the layer to sinter a portion of the material of the layer; and varying the absorption of provided radiation in block (iv) across a selected surface portion of the further layer to sinter a further portion of the material within the overlying further layer and to sinter said further portion with the previously sintered portion of material in the prior layer The variation of radiation absorption may be obtained by providing an amount of radiation absorbent material over the selected surface portion of the layer and the further layer respectively.

The layers of particulate material may be pre-heated substantially immediately after the layer of particulate material is provided and substantially before the radiation absorbent material is provided over the selected surface portion of the layer.

The layers of particulate material may be pre-heated at least two times by the heater before the radiation absorbent material is provided over the selected surface portion of the layer.

The radiation absorption material may be provided by a print head, the print head including an associated thermal control device for controlling the temperature of the radiation absorbent material.

Infrared absorbing pigments or dyes may be provided with the radiation absorbent material.

The radiation absorbent material may have a colour other than black.

A device may comprise a housing, a first print head for providing a first radiation absorbent material, a roller, and a first source of radiation.

The first print head may be positioned between the roller and the first source of radiation.

The device may further comprise a second source of radiation positioned adjacent the roller.

The device may further comprise a second print head for providing a second radiation absorbent material.

The method may further comprise measuring output of radiation absorbent material for a predetermined area and determining whether measured output falls within a predetermined range.

The particulate material may comprise at least one of a polymer, a ceramic, and a metal.

According to various, but not necessarily all, embodiments of the invention there is provided a non-transitory computer-readable storage medium encoded with instructions that, when performed by a processor, cause performance of the method as described in any of the preceding paragraphs.

According to various, but not necessarily all, embodiments of the invention there is provided a computer program that, when run on a computer, performs the method of any of the preceding paragraphs.

According to various, but not necessarily all, embodiments of the invention there is provided an apparatus for selectively combining particulate material, comprising a controller configured to: (i) control the provision of a layer of particulate material to a part bed; (ii) control the provision of radiation to sinter a portion of the material of the layer; (iii) control the provision of a further layer of particulate material overlying the prior layer of particulate material including the previously sintered portion of material; (iv) control the provision of radiation to sinter a further portion of the material within the overlying further layer and to sinter said further portion with the previously sintered portion of material in the prior layer; (v) control the successive repeating of blocks (iii) and (iv) to form a three-dimensional object; and wherein at least some of the layers of particulate material are pre-heated with a heater prior to sintering a portion of the material of the respective layer, the heater being configured to move relative to, and proximate, the particulate material.

The heater may be configured to move within 100 mm of the particulate material.

The heater may be arranged to heat at least some of the layers of particulate material to prevent at least one underlying layer of particulate material from cooling to a temperature at which it curls.

The apparatus may further comprise a source of radiation for providing the radiation, including a reflection device that defines an elliptical configuration.

The apparatus may further comprise a sensor configured to measure a temperature of the particulate material; and the controller may be configured to control the pre-heating of the layers of particulate material using the measured temperature.

The heater may be configured to emit a range of wavelengths with a peak wavelength which is different to that of a radiation source for providing the radiation.

The layers of particulate material may be substantially pre-heated by only the heater.

The apparatus may further comprise a sensor configured to determine a temperature of a sintered portion of the material and the controller may be configured to control energy provided to the sintered portion using the determined temperature.

If the determined temperature is less than a threshold temperature, the energy provided to the sintered portion may be increased.

If the determined temperature is greater than a threshold temperature, the energy provided to the sintered portion may be decreased.

The sensor may be an infra-red camera, a single pyrometer or an array of pyrometers.

The apparatus may further comprise a sensor configured to determine output energy from a radiation source for providing the radiation and the controller may be configured to control the output of energy of the radiation source in response to the determined output energy.

The apparatus may further comprise a source of radiation configured to provide the radiation, the source of radiation being different to the heater.

The heater that pre-heats the layers of particulate material may comprise a source of radiation for providing the radiation.

The apparatus may further comprise a plurality of sources of radiation configured to provide radiation.

At least some of the plurality of sources of radiation may provide radiation having different peak wavelengths.

The apparatus may further comprise one or more filters configured to filter the radiation provided by at least some of the plurality of sources of radiation.

At least some of the plurality of sources of radiation may be individually controllable to provide radiation to the particulate material.

At least some of the plurality of sources of radiation may form the heater.

The apparatus may further comprise a support configured to receive the particulate material, the support comprising a plurality of walls, moveable relative to the support.

At least some of the plurality of walls may include a heater for heating the particulate material.

The controller may be configured to control the provision of a material to the particulate material to be sintered to change the properties of the particulate material to be sintered.

The controller may be configured to control: varying the absorption of provided radiation in block (ii) across a selected surface portion of the layer to sinter a portion of the material of the layer; and varying the absorption of provided radiation in block (iv) across a selected surface portion of the further layer to sinter a further portion of the material within the overlying further layer and to sinter said further portion with the previously sintered portion of material in the prior layer The variation of radiation absorption may be obtained by providing an amount of radiation absorbent material over the selected surface portion of the layer and the further layer respectively.

The layers of particulate material may be pre-heated substantially immediately after the layer of particulate material is provided and substantially before the radiation absorbent material is provided over the selected surface portion of the layer.

The layers of particulate material may be pre-heated at least two times by the heater before the radiation absorbent material is provided over the selected surface portion of the layer.

The apparatus may further comprise a print head configured to provide the radiation absorbent material, the print head including an associated thermal control device for controlling the temperature of the radiation absorbent material.

Infra red absorbing pigments or dyes may be provided with the radiation absorbent material.

The radiation absorbent material may have a colour other than black.

The apparatus may further comprise a device including a housing, a first print head for providing a first radiation absorbent material, a roller, and a first source of radiation.

The first print head may be positioned between the roller and the first source of radiation.

The device may further comprise a second source of radiation positioned adjacent the roller.

The device may further comprise a second print head for providing a second radiation absorbent material.

The apparatus may further comprise a sensor configured to measure output of radiation absorbent material for a predetermined area and the controller may be configured to determine whether measured output falls within a predetermined range.

The particulate material may comprise at least one of a polymer, a ceramic, and a metal.

BRIEF DESCRIPTION

For a better understanding of various examples of embodiments of the present invention reference will now be made by way of example only to the accompanying drawings in which:

FIG. 6b is a side view of the layer of particulate material of FIG. 6a;

FIG. 14 illustrates a schematic diagram of a support for receiving particulate material according to various embodiments of the invention;

FIGS. 15A, 15B, 15C and 15D illustrate schematic side view diagrams of devices for providing radiation absorbent material according to various embodiments of the invention;

DETAILED DESCRIPTION

Figure 1:
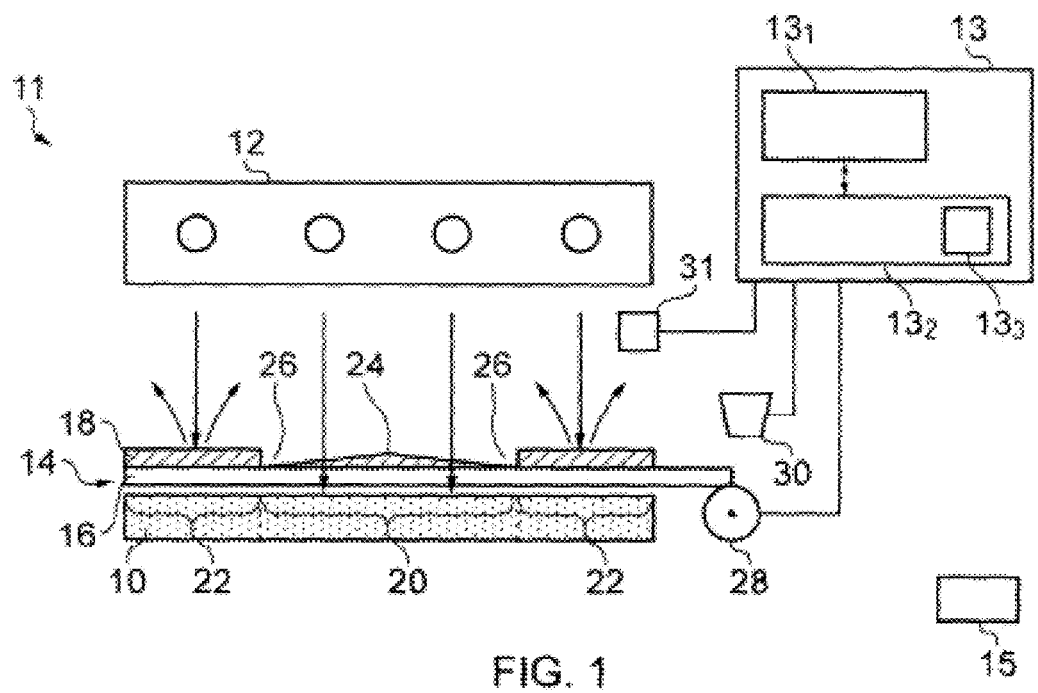
FIG. 1 illustrates a schematic diagram of an apparatus according to various embodiments of the invention.

Referring to the figures, there is shown generally apparatus 11 for combining particulate material, for example, by sintering. The apparatus 11 comprises a controller 13 that is configured to enable the exposure of a surface portion of a layer 10 of particulate material to radiation, for example infra-red radiation provided by a radiation source 12. The controller 13 is also arranged to control the variation of radiation absorption across the surface portion.

The implementation of the controller 13 can be in hardware alone (for example, a circuit, a processor etc), have certain aspects in software including firmware alone or can be a combination of hardware and software (including firmware). The controller 13 may be implemented using instructions that enable hardware functionality, for example, by using executable computer program instructions $13_3$ in a general-purpose or special-purpose processor $13_1$ that may be stored on a computer readable storage medium $13_2$ (disk, memory etc) to be executed by such a processor $13_1$.

The processor $13_1$ is configured to read from and write to the memory $13_2$. The processor $13_1$ may also comprise an output interface via which data and/or commands are output by the processor $13_1$ and an input interface via which data and/or commands are input to the processor $13_1$.

The memory $13_2$ stores a computer program $13_3$ comprising computer program instructions that control the operation of the apparatus 11 when loaded into the processor $13_1$. The computer program instructions $13_3$ provide the logic and routines that enables the apparatus 11 to perform the methods described in the following paragraphs and also those illustrated in FIGS. 9, 10, 11, 12 and 13. The processor $13_1$ by reading the memory $13_2$ is able to load and execute the computer program $13_3$.

The computer program $13_3$ may arrive at the apparatus 11 via any suitable delivery mechanism 15. The delivery mechanism 15 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program $13_3$. The delivery mechanism may be a signal configured to reliably transfer the computer program $13_3$. The apparatus 11 may propagate or transmit the computer program $13_3$ as a computer data signal.

Although the memory $13_2$ is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 illustrates a first embodiment of apparatus for sintering particulate material in which an obscurer 14 (i.e. a mask) is provided for selectively obscuring the radiation provided by the source 12 on the surface portion of the layer 10 to thereby vary the intensity of the radiation incident on the surface portion of the layer 10. The obscurer 14 comprises a radiation transmissive substrate 16, such as a glass plate, which carries a varying amount of radiation reflective material 18, such as aluminium oxide. The amount and pattern of material 18 deposited on the substrate may be varied to selectively vary the intensity of radiation incident on the surface portion of the layer 10, as will be described hereinafter.

Figure 2:
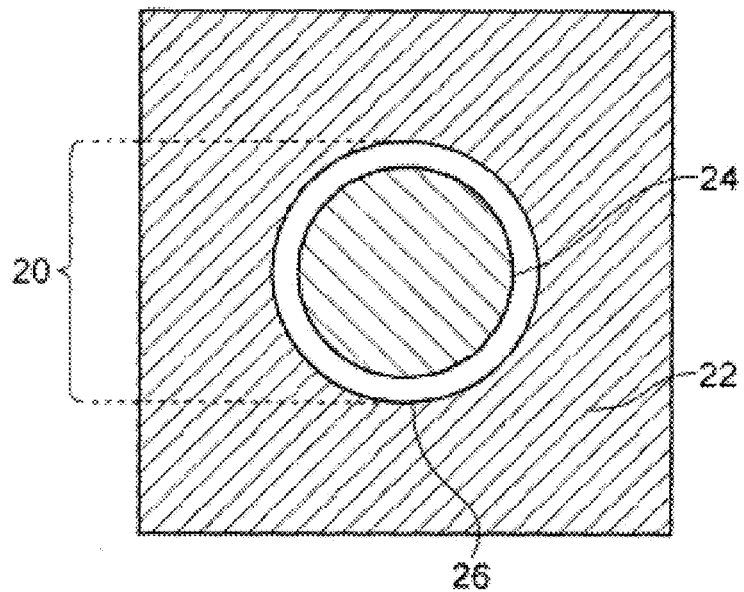
FIG. 2 illustrates a plan view of a surface portion of a layer of particulate material.

Referring also to FIG. 2, the surface portion of the layer 10 is logically divided by the obscurer 14 into a number of areas including a combination portion 20, which is to be exposed to radiation to combine the particulate material, and a non-combination portion 22 which is to be shielded, or at least substantially shielded, from radiation to prevent combination of the particulate material by sintering. Full shielding of the non-combination portion 22 is not essential, provided that the intensity of radiation transmitted to the non-combination portion 22 is such that the particulate material is not heated to its sintering temperature. In some circumstances, transmission of low intensity radiation onto the non-combination portion 22 to heat the material can be desirable and can result in improved accuracy of the finished component. This is because heating material in the non-combination portion 22 reduces the thermal gradient between the material in the combination portion 20 and the non-combination portion 22.

The combination portion 20 is logically divided by the obscurer 14 into a central portion 24 and an edge portion 26, and reflective material 18 is deposited onto the substrate 16 such that a greater amount of the material 18 is provided on the central portion 24 than on the edge portion 26 where no reflective material 18 may be provided. Consequently, the intensity of radiation provided across the surface of the combination portion 20 increases from a minimum value at the central portion 24 to a maximum value at the edge portion 26 where the surface of the layer 10 of particulate material is fully exposed to radiation provided by the radiation source 12.

The layer of reflective material is schematically illustrated in FIG. 1. The variation of thickness of the layer in the figure does not illustrate a variation of thickness of the layer in practice but illustrates a variation in the amount of the material. Where the layer is thick in the figure, in practice there will be a large amount of the material present.

Although the combination portion 20 has been shown to have only one edge portion 26 such that the central portion 24 is located at the centre of the combination portion 20, it should be appreciated that the combination portion 20 may for example be of annular configuration such that the central portion 24 is bounded on two sides by edge portions 26. Moreover, it is not essential that the central portion 24 is located at the centre of the surface portion of the layer 10 of particulate material.

The controller 13 is arranged to control a motor 28 for moving the obscurer 16 from an obscuring position in which it overlies the layer 10, as shown in FIG. 1, to a non-obscuring position in which it does not overly the layer 10. The controller 13 is also arranged to control a deposition device, such as a printing head 30, for depositing the reflective material 18 onto the substrate 16. The controller 13 controls the amount of material 18 deposited by the head 30 onto each part of the substrate 16. In the embodiment shown in FIG. 1, the head 30 remains stationary and deposits reflective material 18 onto the substrate 16 as the motor 28 moves the substrate 16 past the head 30. In an alternative embodiment (not shown), the substrate 16 may remain stationary, overlying the layer 10, and the motor 28 may move the printing head 30 over the substrate 16 to deposit reflective material 18 thereon.

In the illustrated embodiment, the reflective material 18 is contemporaneously printed onto the substrate 16 during operation of the apparatus. The amount of material 18 printed onto the substrate 16 by the head 30 may be varied by the controller 13 according to the surface temperature of the layer 10. The apparatus 11 includes one or more sensors 31 for measuring one or more characteristics of the apparatus 11. The surface temperature of the layer 10 may be measured by a sensor 31 such as a temperature measuring device (for example, a pyrometer or a thermal imaging camera), and surface temperature measurements are communicated in real time to the controller 13. A wiping arrangement (not shown) may be provided for removing reflective material 18 from the substrate 16, so that it can be re-used. Different amounts of material 18 can be deposited onto the substrate 16, in dependence on the desired radiation intensity profile at the substrate surface.

Alternatively, the reflective material 18 may be pre-printed onto the substrate 16 prior to operation of the apparatus and the same pre-printed substrate 16, or a number of pre-printed substrates 16, may be used, one for each layer 10 of particulate material. In this case, measurement of the surface temperature using pyrometer may not be needed. The use of a plurality of pre-printed substrates 16 is particularly advantageous when there is a need to produce a large quantity of the same component since it reduces the time taken to sinter each layer of material and hence produce the prototype component, increases repeatability and leads to a reduction in the cost of producing the components.

It should also be noted that it is within the scope of the present invention to utilise a plurality of pre-printed substrates 16, or to contemporaneously print different amounts of reflective material 18 onto the same substrate 16, and to use these to expose the same layer 10 of material to different radiation intensity profiles in multiple exposure steps.

Figure 3:
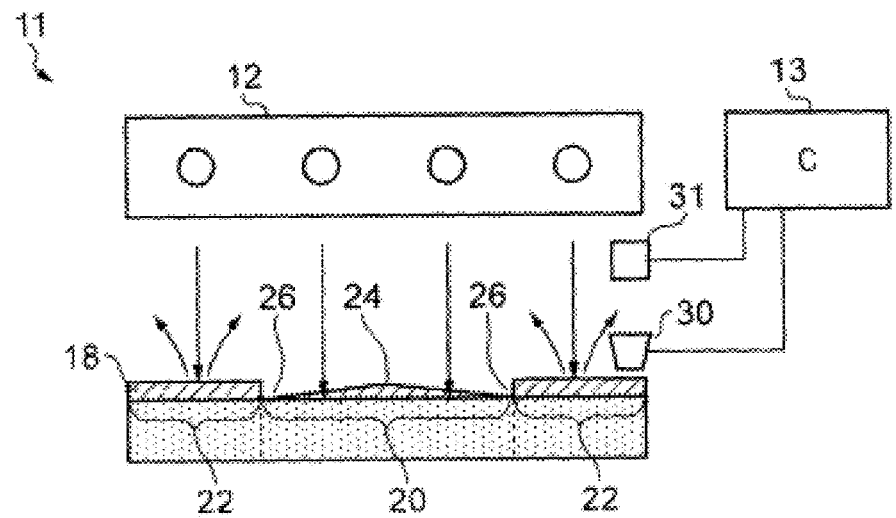
FIG. 3 illustrates a schematic diagram of another apparatus according to various embodiments of the invention.

FIG. 3 illustrates a second embodiment of apparatus for combining particulate material, in which corresponding elements are given corresponding reference numerals. The apparatus of FIG. 3 is similar to that shown in FIG. 1, except that instead of the reflective material 18 being deposited onto a substrate 16, the reflective material 18 is deposited, using the printing head 30, directly onto the surface portion of the layer 10 of particulate material.

In the apparatus of this embodiment, the printing head 30 is again controlled by the controller 13 which controls both the movement of the head 30 across the surface of the layer 10 and the rate of deposition of reflective material 18 onto the layer 10. Again, real time measurement of the surface temperature of the layer 10 may be carried out using a temperature measurement device 31, for example, a pyrometer P or thermal imaging camera, the temperature measurement being used by the controller 13 to determine the amount of reflective material 18 to be printed by the head 30 onto the surface portion of the layer 10.

The layer of reflective material is schematically illustrated in FIG. 3. The variation of thickness of the layer in the figure does not illustrate a variation of thickness of the layer in practice but illustrates a variation in the amount of the material. Where the layer is thick in the figure, in practice there will be a large amount of the material present.

Figure 4:
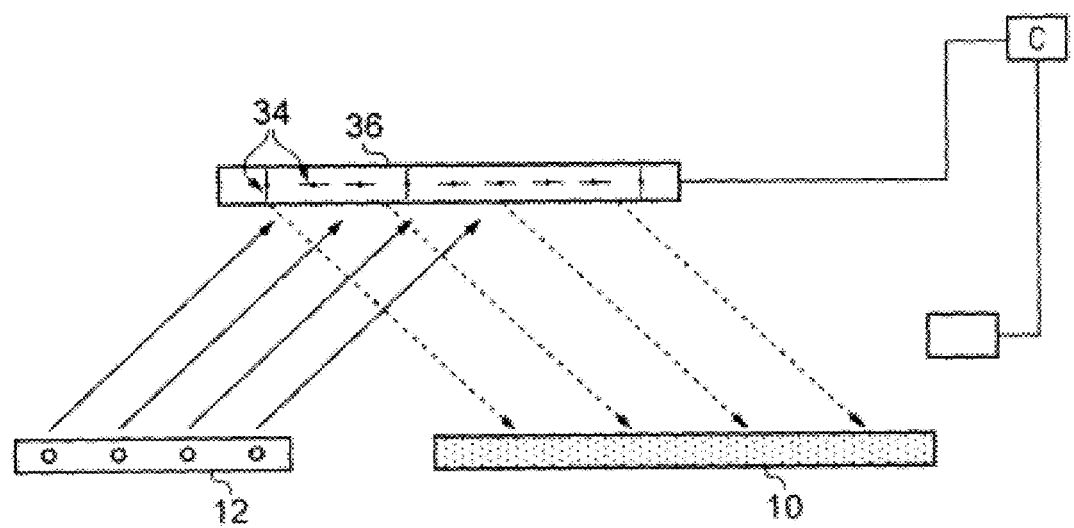
FIG. 4 illustrates a schematic diagram of a further apparatus according to various embodiments of the invention.

FIG. 4 illustrates a third embodiment of apparatus for combining particulate material which is similar to the first and second embodiments and in which corresponding elements are given corresponding reference numerals. In this embodiment, the controller 13 is arranged to selectively redirect the radiation provided by the source 12 and thereby vary the radiation intensity incident across the surface portion of the layer 10. Selective redirection of the radiation is achieved by controlling, using the controller 13, a plurality of mirrors 34 which form a Digital Mirror Device (DMD) 36. Each mirror 34 is adjustable by the controller to an operative position, in which radiation is fully redirected onto the surface portion of the layer 10, or to an inoperative position in which radiation is fully redirected away from the surface portion. By providing an array of mirrors 34, the surface portion of the layer 10 can be effectively divided into an array of segments, as discussed hereinafter, and the intensity of the radiation incident on each segment can be varied, according to a bitmap image, by selectively varying the frequencies at which individual mirrors 34 are moved between the operative and inoperative positions.

Use of a temperature measurement device, such as a pyrometer, although optional is particularly advantageous with the apparatus of this embodiment as the position of each mirror 34 can be instantaneously controlled, in real time, by the controller 13 in response to instantaneous temperature variations across the surface portion of the layer 10.

Figure 5:
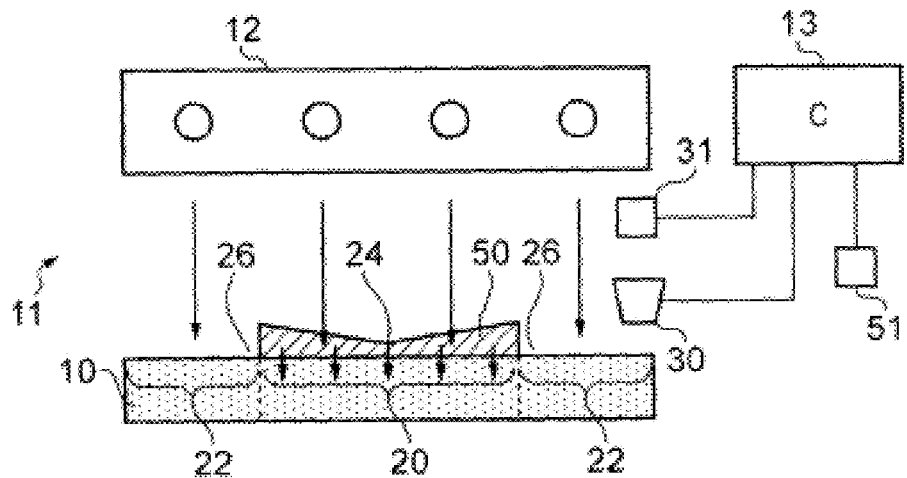
FIG. 5 illustrates a schematic diagram of another apparatus according to various embodiments of the invention.

FIG. 5 illustrates a fourth embodiment of apparatus for combining particulate material which is similar to the embodiments described above and in which corresponding elements have been given corresponding reference numerals.

The apparatus of FIG. 5 is most similar to the apparatus of FIG. 3 in that material is deposited directly onto the surface portion of the layer 10 of particulate material. However, according to the fourth embodiment, the material is a radiation absorbent material 50, for example a material including carbon black in powder form. In use, radiation provided by the radiation source 12 is absorbed by the radiation absorbent material 50 where it is present on the surface, causing the radiation absorbent material 50 to heat up. Heat from the radiation absorbent material 50 is transferred to the underlying particulate material raising the temperature of individual particles of the particulate material. As the particles are heated to a temperature approaching their melting temperature, they neck and coalesce with adjacent heated particles. As the temperature subsequently decreases, the particles form a coherent mass of combined particulate material.

The deposition of a radiation absorbent material 50 directly onto the surface portion of the layer 10 enables the radiation absorptive properties of the particulate material to be varied and carefully controlled, as desired. In various embodiments, a constant amount of radiation absorbent material 50 is provided on the surface of the particulate material 10 and this may be repeated for some or all layers 10 of particulate material to form a three dimensional object. In other embodiments, varying the amount of the radiation absorbent material 50 on the surface enables the variation of the radiation absorptive properties of the surface portion of the underlying layer 10 of particulate material. In areas where there is a greater amount of the radiation absorbent material 50, a greater amount of the radiation provided by the radiation source 12 is absorbed. This provides for a greater amount of heat transfer to the underlying particulate material thereby heating it to a higher temperature and causing it to combine more rapidly. In areas where there is less absorbent material 50, there is lower radiation absorption and hence less heat transfer to the underlying particulate material, causing it to combine at a slower rate.

In areas where no radiation absorbent material 50 is provided and pure particulate material is exposed to the radiation provided by the radiation source 12, there will be insufficient absorption of the radiation to heat the particulate material to its melting temperature. Thus, there will be no combination of the particulate material in areas where no radiation absorbent material 50 is provided.

The layer of radiation absorbent material 50 is schematically illustrated in FIG. 5. The variation of thickness of the layer in the figure does not illustrate a variation of thickness of the layer in practice but illustrates a variation in the amount of the material. Where the layer is thick in the figure, in practice there will be a large amount of the material present.

As with the embodiments of FIGS. 1 and 3, it may be desirable to provide for a greater amount of radiation absorption at the edge portion 26 of the combination portion 20 than at the central portion 24. Accordingly, the amount of the radiation absorbent material 50 decreases from a maximum value at the edge portion 26 to a minimum value at the central portion 24.

As illustrated, no radiation absorbent material 50 is provided on the surface portion of the layer 10 of the particulate material in the non-combination portion 22. For the reasons explained above, there will be no combination of the particulate material in the non-combination portion 22 when the layer 10 is exposed to radiation. There may however be some heating of the particulate material in the non-combination portion 22, and this can be advantageous to minimise the thermal gradient between the particulate material in the combination portion 20 and the non-combination portion 22, as already discussed.

As with the embodiment of FIG. 3, the printing head 30 is operable to deposit desired amounts of the radiation absorbent material 50 onto the surface portion of the layer 10, and the movement of the printing head 30 and the amount of material 50 deposited by the head 30 is controlled by the controller 13. Again, the pyrometer or a thermal imaging camera may be used to measure the surface temperature of the layer 10, the amount of radiation absorbent material 50 deposited being varied by the controller 13 in accordance with the temperature measurements.

The applicant has appreciated that when the particulate material is combined by sintering at a slow rate, the combined material has good material properties, for example high strength, but has poor definition at the edge portion 26. The poor edge definition arises because as the particulate material combines, there is some shrinkage which causes unwanted movement of uncombined particulate material from the non-combination portion 22 towards the combination portion 20. On the other hand, when the particulate material is combined by sintering at a rapid rate, the combined material has inferior material properties, but has good edge definition since the particulate material in the edge portion 26 is rapidly combined and locked in position, thereby minimising unwanted movement of surrounding uncombined particulate material.

In order to provide a layer 10 of combined particulate material having good material properties and good definition at the edge portion 26, it is thus desirable to cause the particulate material in the combination portion 20 to combine at a slow rate to provide good material properties, and to cause the particulate material at the edge portion 26 to combine rapidly to provide good edge definition.

One method by which this can be achieved is to use the apparatus according to the different embodiments of the invention described above to provide for greater absorption of radiation at the edge portion 26 than over the remainder of the combination portion 20. This can be achieved by varying the intensity of the radiation incident on the selected surface portion of the layer 10 using the apparatus according to the first, second or third embodiments, or by varying the absorption of the radiation across the selected surface portion by providing a variable amount of radiation absorbent material 50 across the surface portion. In all of the above cases, radiation is provided over the layer 10 in a single exposure step.

Using the apparatus according to the fourth embodiment of the invention, similar results may be achieved by providing radiation over the layer 10 of particulate material in multiple exposure steps, as will now be discussed.

According to a first method, a constant first amount of radiation absorbent material 50 is provided over the combination portion 20, and radiation is then provided over the layer 10, using the radiation source 12, to cause the underlying particulate material in the combination portion 20 to combine. The first amount of radiation absorbent material 50 is selected to be a relatively low amount so that the underlying particulate material combines at a slow rate and has good material properties.

After the particulate material has been combined, further particulate material is added to the layer 10 at the edge portion 26 where there will have been shrinkage. A second amount of the same radiation absorbent material 50, which is greater than the first amount, is then provided over the edge portion 26, and radiation is again provided over the layer 10 using the radiation source 12. The second amount of material is selected to be a relatively high amount so that the underlying particulate material is caused to combine at a rapid rate. Due to the increased amount of radiation absorbent material 50 present at the edge portion 26, and hence the rapid combination of the underlying particulate material, material shrinkage is minimised thus providing the resultant layer 10 of combined material with good definition at the edge portion 26.

According to a second method, a constant amount of a first radiation absorbent material 50 having a first natural radiation absorbency is provided over the combination portion 20, and radiation provided over the layer 10, using the radiation source 12, to cause the underlying particulate material in the combination portion 20 to combine. The first radiation absorbent material 50 is selected to have a low natural radiation absorbency so that a relatively low amount of the radiation is absorbed and so that the underlying particulate material combines at a slow rate and has good material properties.

After the particulate material has been combined, further particulate material is added to the layer 10 at the edge portion 26 where there will have been shrinkage. A second different radiation absorbent material 50, having a second natural radiation absorbency, is then provided over the edge portion 26, and radiation is again provided over the layer 10 using the radiation source 12. The second radiation absorbent material 50 is selected to have a high natural radiation absorbency, which is higher than the absorbency of the first radiation absorbent material 50, so that a high amount of the radiation is absorbed and so that the underlying particulate material in the edge portion 26 combines at a rapid rate.

According to a third method, a first radiation absorbent material 50 capable of absorbing a first wavelength or spectral range of radiation is provided over the combination portion 20, and radiation of a first wavelength or spectral range is then provided over the layer 10, using the radiation source 12, to cause the underlying particulate material in the combination portion 20 to combine.

After the particulate material has been combined, further particulate material is added to the layer 10 at the edge portion 26 where there will have been shrinkage. A second radiation absorbent material 50, capable of absorbing a second different wavelength or spectral range of radiation, is then provided over the edge portion 26, and radiation of a second wavelength or spectral range is provided over the layer 10 using the radiation source 12.

In order to provide the desired material properties in the combination portion 20, the radiation at the first wavelength or spectral range may be selected to have a relatively low intensity so that the first radiation absorbent material 50 is heated at a slow rate thereby causing the underlying particulate material to combine at a slow rate. In order to provide good definition at the edge portion 26, the radiation at the second wavelength or spectral range may selected to have a relatively high intensity so that the second radiation absorbent material 50 is heated rapidly thereby causing the underlying particulate material to combine at a rapid rate.

Alternatively, a greater amount of the second radiation absorbent material 50 than the first radiation absorbent material 50 may be provided, as described above with reference to the first method, and the radiation of the first and second wavelengths or spectral ranges provided by the radiation source 12 selected to have the same intensity.

As a further alternative, the second radiation absorbent material 50 may be selected to have a higher natural radiation absorbency than the first radiation absorbent material 50, as described above with reference to the second method, and the radiation of the first and second wavelengths or spectral ranges provided by the radiation source 12 selected to have the same intensity.

If desired, the third method could be adapted so that the first and second radiation absorbent materials 50 are simultaneously applied to the surface of the layer of particulate material, and the radiation of the first and second wavelengths or spectral ranges provided in separate steps.

It is possible that the first, second and third methods described above could be modified so that the particulate material at the edge portion 26 of the layer 10 is initially caused to combine at a rapid rate to lock the edge portion 26, and the particulate material in the remainder of the combination portion 20 is subsequently caused to combine at a slow rate to provide the desired material properties.

Figure 6A:
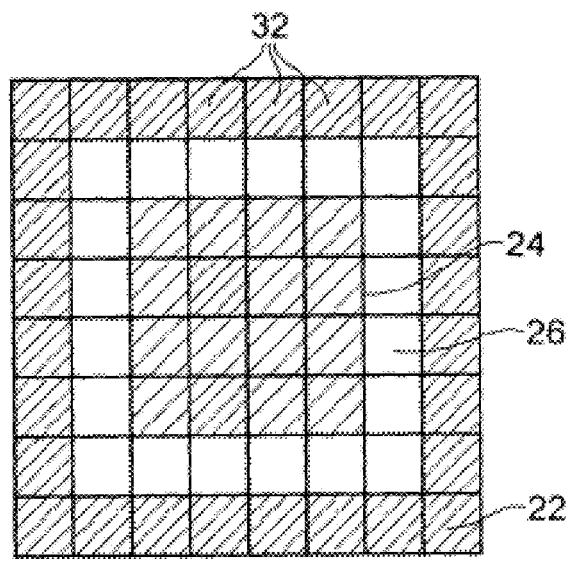
FIG. 6a illustrates a plan view of a surface portion of a layer of particulate material.
Figure 6B:
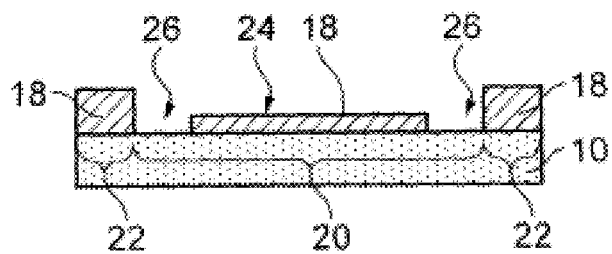

Referring now to FIGS. 6a and 6b, the apparatus according to the invention allows the surface portion of the layer 10 of particulate material to be logically divided into an array of segments 32. The controller 13 can control the amount of radiation absorption on each segment 32 independently and a bitmap image can be used to specify the amount of radiation that should be absorbed at the surface portion. The greyscale of each segment 32 of the bitmap image is individually adjustable, and in the case of the first and second embodiments of the apparatus, the amount of reflective material 18 deposited onto each segment of the substrate 16 or surface portion of the layer 10 is individually adjustable, according to the bitmap image, to provide any desired radiation intensity profile over the surface portion of the layer 10. When the apparatus of the third embodiment is employed, the mirrors 34 are adjusted to vary the intensity of radiation incident on each segment 32 of the array. When the apparatus of the fourth embodiment is used, the amount of radiation absorbent material 50 deposited onto each segment of the surface portion of the layer 10 is individually adjustable, according to the bitmap image, to provide any desired radiation absorption profile over the surface portion of the layer 10.

In the arrangement shown in FIGS. 6a and 6b, a first amount of reflective material 18 has been deposited by printing head 30 onto the segments 32 defining the central portion 24 of the combination portion 20. Accordingly, a first intensity of radiation, which is less than the maximum intensity, is incident on the surface portion of the layer 10 located beneath these segments 32. The first intensity of radiation is sufficiently high to raise the temperature of the particulate material to cause it to combine.

No reflective material 18 has been provided on the segments 32 which define the edge portion 26 of the combination portion 20, thereby allowing a maximum intensity of radiation to reach the surface portion of the layer 10 located beneath these segments 32. The maximum intensity of radiation causes the particulate material located beneath the segments 32 defining the edge portion 26 to combine more quickly than particulate material in the central portion 24.

A second amount of reflective material 18, which is greater than the first amount, is deposited by printing head 30 onto the segments 32 defining the non-combination portion 22. A sufficient amount of material 18 may be provided to prevent transmission of any radiation to the surface portion of the layer 10 located beneath these segments 32. Consequently, the particulate material located beneath these segments 32 does not combine.

Whilst variation of the radiation intensity on each individual segment 32 has been described with respect to the second embodiment of the apparatus, it is to be understood that the same effect can be achieved using apparatus according to the first embodiment, in which reflective material 18 is printed onto a substrate 16, according to the third embodiment, in which mirrors 34 are used to vary the intensity of radiation incident on each segment 32, or according to the fourth embodiment in which radiation absorbent material 50 is printed onto the surface portion of the layer 10 of particulate material.

The layer of reflective material is schematically illustrated in FIG. 6b. The variation of thickness of the layer in the figure does not illustrate a variation of thickness of the layer in practice but illustrates a variation in the amount of the material. Where the layer is thick in the figure, in practice there will be a large amount of the material present.

Figure 7:
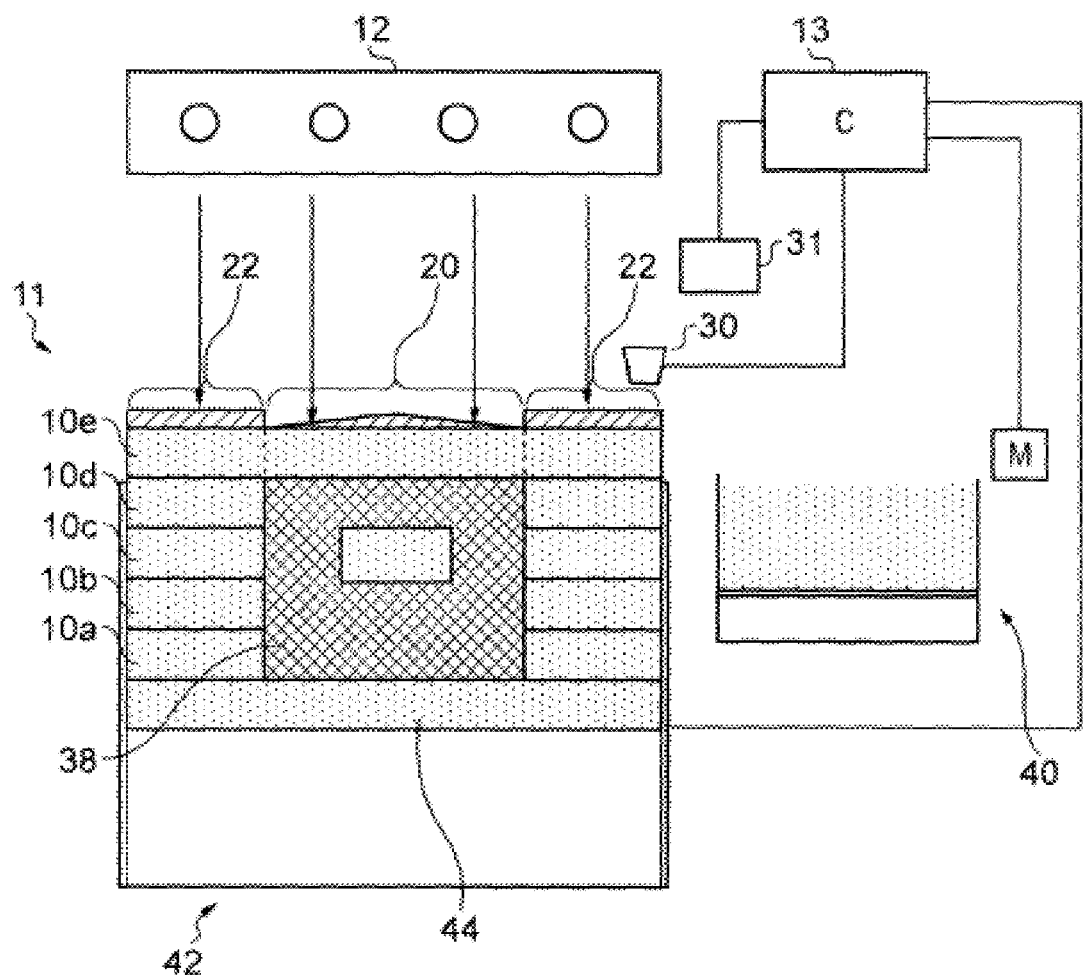
FIG. 7 illustrates a schematic diagram of an apparatus for combining particulate material being used to form a three dimensional object.

Referring now to FIG. 7, there is shown a diagrammatic illustration of the apparatus of FIG. 3 being used to form a three dimensional object 38. Again, elements of the apparatus which have been referred to above are given corresponding reference numerals.

The apparatus is used to form a three dimensional object 38 by combining a plurality of layers 10a to 10e of particulate material. A supply of particulate material, for example Nylon powder, is provided in a supply tank 40 and the controller 13 is arranged to control a motor M which can move particulate material from the tank 40 into a building device 42, which includes a vertically movable platform 44. Movement of the platform 44 is controlled by the controller 13, such that the platform 44 is moved vertically downwards in discrete steps after each layer 10 has been formed.

Initially, with the platform 44 in an uppermost position, the controller 13 actuates the motor M to provide a first layer 10a of particulate material on the platform 44. The controller 13 then actuates the printing head 30 to deposit a desired pattern of reflective material 18 onto the surface portion of the layer 10 of material. Alternatively, the reflective material 18 may be deposited by the printing head 30 onto a substrate 16, as previously discussed, or the intensity incident at the surface may be controlled using digital mirrors.

The controller 13 then activates the radiation source 12 to provide radiation over a selected surface portion of the layer 10, as defined by the reflective material 18. As shown in FIG. 7, radiation is provided with varying intensity across the combination portion 20 and the material in this portion is combined. The reflective material 18 prevents, or at least substantially prevents, transmission of radiation to the surface portion of the material in the non-combination portion 22 where the material is not combined and remains in particulate form. The varying amount of reflective material 18 thus provides for variable intensity radiation across the combination portion 20 of the layer 10.

After combination of the material in the combination portion 20 of the first layer 10a has been carried out, the controller 13 deactivates the radiation source 12 and lowers the platform 44 by a distance approximately equivalent to the desired layer thickness. The controller 13 then actuates the motor M to provide a second layer 10b of particulate material overlying the first layer 10a including a previously combined portion of material. The controller 13 then actuates the printing head 30 to deposit reflective material 18 onto the surface portion of the second layer 10b. The amount and pattern of reflective material 18 deposited onto the surface portion of the second layer 10b may be the same as that provided on the first layer 10a, or may be different, for example in response to design or surface temperature measurements carried out using the pyrometer. The controller 13 then activates the radiation source 12 to provide radiation across the surface portion of the second layer 10b, the reflective material 18 providing for variable intensity radiation across the surface portion. The material in the combination portion 20 of the second layer 10b is thus caused to combine, and also to combine with the previously combined portion of material in the first layer 10a. The adjacent layers 10a, 10b are thus combined to form part of a coherent object 38.

The controller 13 continues to operate in this manner to provide further layers 10c to 10e of particulate material and combine them, until formation of the object 38 has been completed. Once the coherent object 38 has been formed, the platform 44 is raised by the controller 13 to eject the combined object 38 and any remaining uncombined particulate material surrounding the object 38 from the device 42.

Again, it should be appreciated that the apparatus according to any of the other embodiments of the invention may be used to form a three dimensional object 38.

Figure 8:
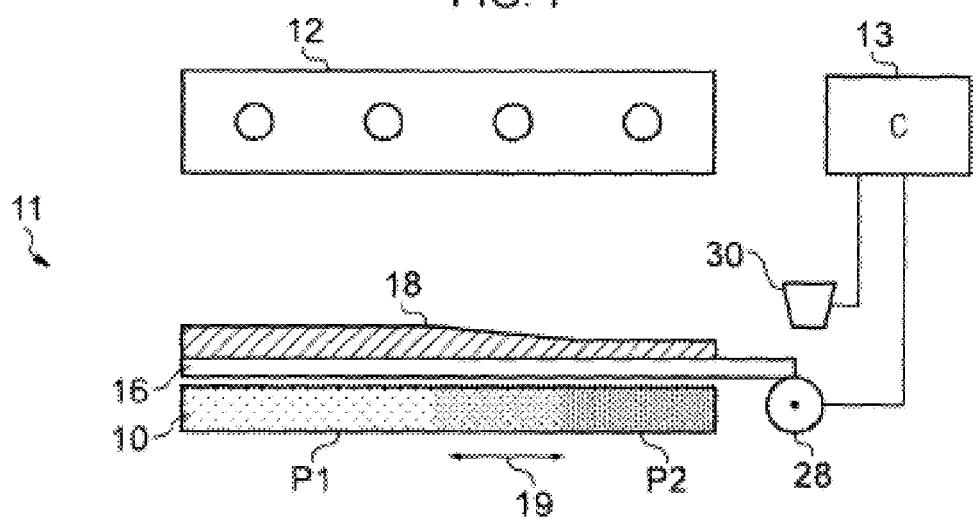
FIG. 8 illustrates the apparatus of FIG. 1 being used to combine different types of particulate material.

FIG. 8 illustrates use of the apparatus of FIG. 1 to combine different particulate materials P1 and P2 which are located adjacent to each other in a layer 10. By way of illustration, the material P1, for example copper, may have a lower melting point than the material P2, for example steel, and may therefore combine by sintering at a lower temperature. The concentration of material P2 decreases from right to left across a transition gradient region 19. The concentration of material P1 decreases from left to right across the transition gradient region 19.

In order to ensure optimum material characteristics and minimise thermal stresses over the gradient region 19 between the materials P1 and P2, the substrate 16 may be provided with a high amount of reflective material 18 on the portion overlying the material P1 of the layer 10, a low amount of reflective material on the portion overlying the material P2 and an amount of reflective material over the gradient region 19 that decreases from left to right in the figure. By varying radiation intensity in this way, the materials P1 and P2 are heated to different temperatures using a fixed intensity radiation source 12 and are simultaneously combined to form a coherent layer.

The layer of reflective material 18 is schematically illustrated in FIG. 8. The variation of thickness of the layer in the figure does not illustrate a variation of thickness of the layer in practice but illustrates a variation in the amount of the material. Where the layer is thick in the figure, in practice there will be a large amount of the material present Whilst the first embodiment of the apparatus has been described for use in combining the dissimilar particulate materials P1 and P2, it will be readily appreciated that the second embodiment of the apparatus in which reflective material 18 is printed directly onto the surface portion of the layer 10, the third embodiment of the apparatus which uses mirrors 34 to selectively redirect radiation, or the fourth embodiment of the apparatus in which radiation absorbent material 50 is printed directly onto the surface portion of the layer 10, could alternatively be used.

In any of the above described embodiments, it may be desirable to add radiation absorbing material to the particulate material to increase the absorption of radiation. For example, a material such as carbon black may be used for this purpose.

Other particulate materials, such as ceramic filler powder, may be added to the particulate material to improve the material properties of the resultant component.

Where different radiation absorbent materials are employed, for example as described above with reference to FIG. 5, these may be of different colours to provide the resultant component with desired aesthetic properties. For example, the radiation absorbent materials may have a colour other than black.

Figure 9:
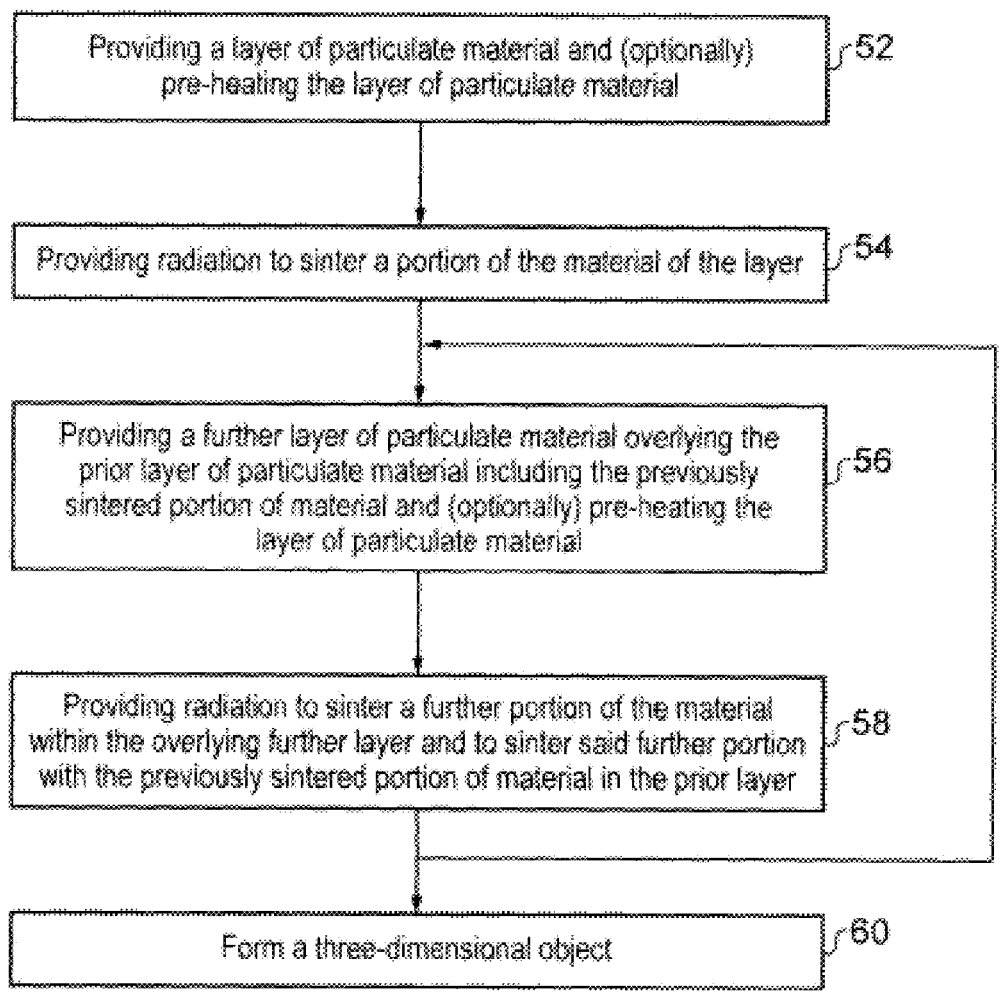
FIG. 9 illustrates a flow diagram of a method of selectively combining particulate material according to various embodiments of the invention.

FIG. 9 illustrates a flow diagram of a method of selectively combining particulate material according to various embodiments of the invention. The method illustrated in FIG. 9 may be implemented by any apparatus that is configured to selectively combine particulate material via sintering. For example, the method may be implemented by a selective laser sintering apparatus, a selective inhibition apparatus, a selective masking apparatus, a sintering apparatus that utilises radiation absorbent material and by the various apparatus 11 illustrated in FIGS. 1 to 8.

At block 52, the method includes providing a layer of particulate material to a support (which may also be referred to as a part bed). Next, at block 54, the method includes providing radiation from a source of radiation to sinter a portion of the material of the layer. The source of radiation may be any suitable source that is configured to emit electromagnetic waves in any suitable wavelength(s). For example, the source of radiation may be a laser.

At block 56, the method includes providing a further layer of particulate material overlying the prior layer of particulate material including the previously sintered portion of material. Then at block 58, the method includes providing radiation to sinter a further portion of the material within the overlying further layer and to sinter said further portion with the previously sintered portion of material in the prior layer. The method then successively repeats blocks 56 and 58 to form a three-dimensional object in block 60.

It should be appreciated that in blocks 52 and 54, the method may also include providing a radiation absorbent material, a reflective material or a reflective mask after the layers of particulate material have been provided.

For at least some of the layers of particulate material, a heater (such as heater 51 illustrated in FIG. 5) pre-heats the particulate material prior to the apparatus sintering a portion of the material of the respective layer. For example, in block 52 and/or block 54, the method may further include controlling the heater to pre-heat the previously provided layer of particulate material.

It should be appreciated that the layers of particulate material may be pre-heated substantially immediately after the layer of particulate material is provided and before the radiation to initiate sintering of the particulate material is provided over the selected surface portion of the layer. In some embodiments, the layers of particulate material may be pre-heated at least two times by the heater before the radiation to initiate sintering of the particulate material is provided over the selected surface portion of the layer The heater may be any source of radiation and may be configured to move relative to the particulate material and proximate the particulate material. The heater may be considered to be proximate to the particulate material if it is a distance less than 100 mm from the particulate material. This could involve a heating lamp that traverses the part bed surface following the particulate material deposition device at a height of 100 mm or less above the surface of the part bed. The heater may be the same device as the source of radiation or may be a different device. Where the apparatus includes a device for providing the particulate material and/or reflective material or radiation absorbent material, the heater may be housed within the housing of the device and may therefore move with the device.

In various embodiments, the heater may be configured to emit a range of wavelengths with a peak wavelength which is different to that of the radiation source for providing the radiation (for example, the radiation source 12 illustrated in FIG. 1) and the layers of particulate material may be substantially pre-heated by only the heater (i.e. it may not be pre-heated by the source of radiation).

The method illustrated in FIG. 9 may provide several advantages. For example, heat from the proximate heater may be quickly transferred to the deposited particulate material such that the underlying sintered material is less likely to cool to a temperature at which it will curl upwards. Also, the heat from the proximate heater may be efficiently transferred to the recently deposited powder and may not heat other parts of the machine. Also the proximate heater will allow the deposited powder to reach a temperature at which it is ready to be sintered quickly and this may lead to a quicker overall manufacturing process.

Figure 10:
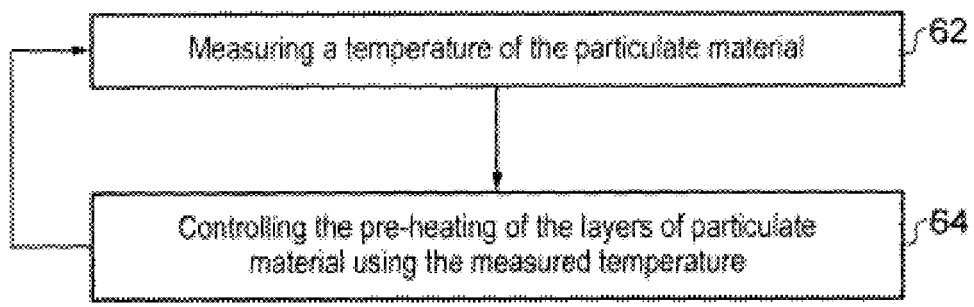
FIG. 10 illustrates a flow diagram of a method of controlling temperature of particulate material according to various embodiments of the invention.

FIG. 10 illustrates a flow diagram of a method of controlling temperature of particulate material according to various embodiments of the invention. The method illustrated in FIG. 10 may be performed with the method illustrated in FIG. 9. At block 62, the method includes measuring a temperature of the particulate material. For example, one or more of the sensors 31 may include an infra-red camera, a single pyrometer or an array of pyrometers for measuring the temperature of the particulate material. At block 64, the method includes controlling the pre-heating of the layers of particulate material using the measured temperature. For example, the controller 13 may control the heater to increase or decrease the heat energy provided by the heater. The method may then loop back to block 62 and be repeated.

The method illustrated in FIG. 10 may advantageously help to prevent underlying sintered material cooling to a temperature at which it will curl upwards.

Figure 11:
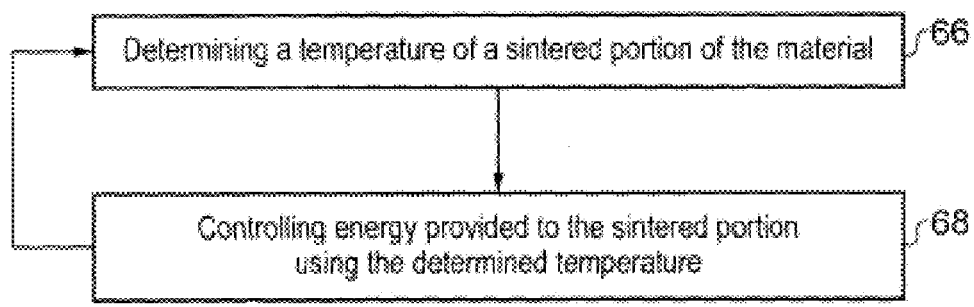
FIG. 11 illustrates a flow diagram of a method of controlling temperature of a sintered portion of the particulate material according to various embodiments of the invention.

FIG. 11 illustrates a flow diagram of a method of controlling temperature of a sintered portion of the particulate material according to various embodiments of the invention. The method illustrated in FIG. 11 may be implemented by any apparatus that is configured to selectively combine particulate material via sintering. For example, the method may be implemented by a selective laser sintering apparatus, a selective inhibition apparatus, a selective masking apparatus, a sintering apparatus that utilises radiation absorbent material and by the various apparatus 11 illustrated in FIGS. 1 to 8. The method illustrated in FIG. 11 may be performed with the methods illustrated in FIGS. 9 and 10 or may be performed independently of the methods illustrated in FIGS. 9 and 10.

At block 66, the method includes determining the temperature of a sintered portion of the particulate material. For example, one or more of the sensors 31 (e.g. an infra-red camera, a single pyrometer or an array of pyrometers) may measure and determine the temperature of the sintered portion of the particulate material.

At block 68, the method includes controlling the energy provided to the sintered portion using the determined temperature. For example, if the determined temperature is less than a threshold temperature, the controller 13 controls the source of radiation so that the energy provided to the sintered portion is increased. By way of another example, if the determined temperature is greater than a threshold temperature, the controller 13 controls the source of radiation so that the energy provided to the sintered portion is decreased. The method may then loop back to block 66 and be repeated.

A thermal imaging camera may record the temperatures generated in specific locations where sintering occurs (i.e. where a laser has scanned in laser sintering or where radiation absorbent material has been printed and lamp power is applied). Using information of the 2D profile of a given layer it will be possible to record the temperature in the sintered regions of a powder bed only. If the peak temperatures recorded in these regions are too low, a warning could be provided (e.g. via an audible alarm) that there may be a weakness in parts due to in sufficient heating. Also, the apparatus could add more energy, for example by increasing part bed set temperature or applied sintering energy. Similarly, if the peak temperature recorded from these regions is too high a warning could be provided that parts may be weak having degraded under too much thermal energy. Also the apparatus could reduce energy, for example, by reducing part bed set temperature or reducing applied sintering energy.

Thermal monitoring of a sintered area enables determination of part properties (where research determines minimum temperature required within sintered area to achieve required or desired part properties). This may be performed through comparing the 2D profile (e.g. a bitmap image) of the current layer to the infra-red camera output in the same region. This process therefore ensures that the part has reached a minimum temperature and that parts will reach desired mechanical properties. If one area of the printed image is too low in temperature then over-head heaters may increase temperatures in that area, or the sintering energy source(s) (e.g. lamp or laser) may output more energy, or more ink including radiation absorbent material may be printed in this area.

The method illustrated in FIG. 11 may provide an advantage in that it may enable the reduction of energy provided to the part bed. Reducing the energy provided to the part bed can bring various advantages. For example, it can help to ensure that un-sintered powder does not "cake" too strongly and is thus easy to separate from the sintered material (i.e. the part or parts) after the build is complete. If the temperature of the sintered area is too high (again, verified through research), then energy input (sintering energy source, over-head heaters, heating lamp, volume of radiation absorbent material) may be reduced to reduce powder bed hardness and/or power usage. By responding to the measured temperatures by increasing or decreasing the sintering energy (e.g. energy supplied by the laser in laser sintering or by increasing the volume of radiation absorbent material) it is possible to increase energy supplied in some locations and while decreasing energy supplied in other locations within a single layer.

The cost of the apparatus 11 may be advantageously reduced if a single pyrometer or an array of pyrometers is used instead of an infra-red camera. The pyrometers may be calibrated for different materials within the part bed.

Figure 12:
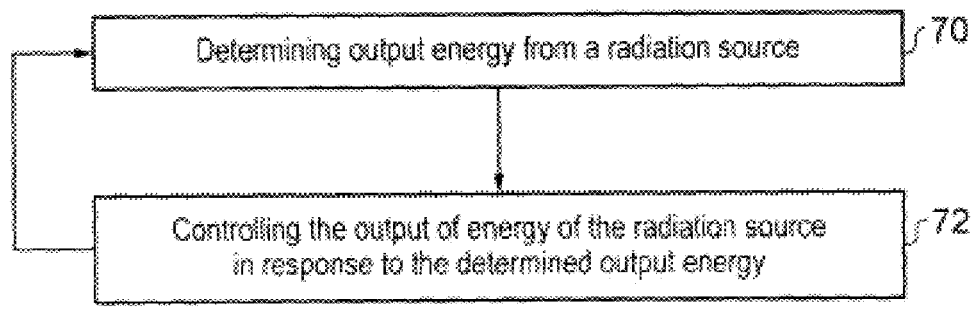
FIG. 12 illustrates a flow diagram of a method of controlling output energy from a source of radiation according to various embodiments of the invention.

FIG. 12 illustrates a flow diagram of a method of controlling output energy from a source of radiation according to various embodiments of the invention. The method illustrated in FIG. 12 may be implemented by any apparatus that is configured to selectively combine particulate material via sintering. For example, the method may be implemented by a selective laser sintering apparatus, a selective inhibition apparatus, a selective masking apparatus, a sintering apparatus that utilises radiation absorbent material and by the various apparatus 11 illustrated in FIGS. 1 to 8. The method illustrated in FIG. 12 may be performed with the methods illustrated in FIGS. 9 and 10 and/or 11, or may be performed independently of the methods illustrated in FIGS. 9, 10 and 11.

At block 70, the method includes determining the output energy of a source of radiation. For example, the one or more sensors 31 may include an infra red measurement sensor that is positioned within the build chamber to measure the output of an infra red emitter 12 during the build. The sensor 31 is configured to measure degradation or other changes in output of the infra red emitter 12. At block 72, the method includes controlling the output energy of the radiation source 12 in response to the determined output energy. Consequently, the radiation source's output may be adjusted to the level required within the current build. A plurality of sensors 31 may be employed in case there is a drop-off of power supplied at any point along the length of the radiation source 12. The method may then loop back to block 70 and be repeated.

Figure 13:
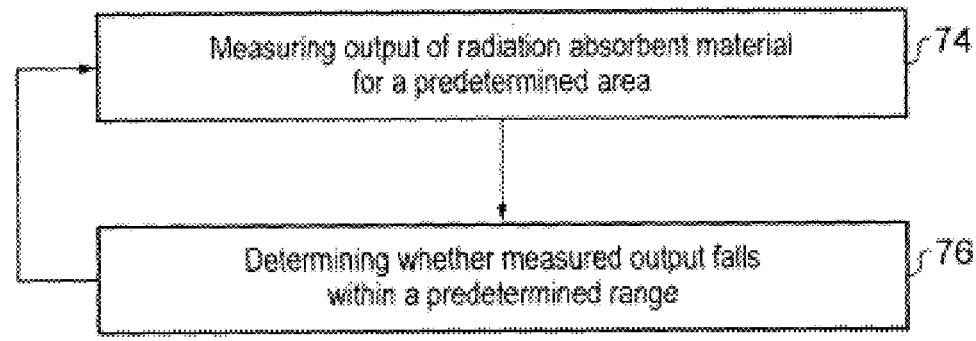
FIG. 13 illustrates a flow diagram of a method of measuring output of radiation absorbent material according to various embodiments of the invention.

FIG. 13 illustrates a flow diagram of a method of measuring output of radiation absorbent material according to various embodiments of the invention. The method illustrated in FIG. 13 may be used in any apparatus that sinters particulate material using radiation absorbent material. The method illustrated in FIG. 13 may be performed with the methods illustrated in FIGS. 9 and 10 and/or 11 and/or 12, or may be performed independently of the methods illustrated in FIGS. 9, 10, 11 and 12.

At block 74, the method includes measuring the output of radiation absorbent material over a predetermined area. For example, the controller 13 may measure the output of radiation absorbent material by measuring a change in the volume of the stored radiation absorbent material (detected by one of the sensors 31).

At block 76, the method includes determining whether the measured output of radiation absorbent material falls within a predetermined range. For example, the apparatus 11 may provide radiation absorbent material (whilst stationary) for an image with a known number of pixels and therefore a known amount of ink (for example, where 1 pixel=80 picoliters, therefore $1.25 \cdot 10^9$ pixels=0.1 liters of ink). The controller 13 may then determine whether the amount of used radiation absorbent material is within a predetermined range of the calculated amount. If the amount of used radiation absorbent material is outside of the predetermined range, the controller 13 may control an alarm to alert the user. Additionally, if the amount of used radiation absorbent material is outside of the predetermined range, the controller 13 may change the amount of radiation absorbent material applied subsequently such that an amount of radiation absorbent material supplied subsequently is in the predetermined range.

The method illustrated in FIG. 13 provides an advantage in that it may enable a relatively consistent volume of radiation absorbent material to be applied since a user is informed if the apparatus 11 becomes inconsistent in providing radiation absorbent material.

FIG. 14 illustrates a schematic plan view of a support 78 for receiving particulate material according to various embodiments of the invention. The support 78, which may also be referred to as a part bed, defines a container for receiving particulate material to be sintered (e.g. which may be deposited from an overhead hopper or may be rolled to the support 78 via a side container of particulate material). The support 78 comprises a plurality of walls 80 that are moveable relative to the support 78 and within the support 78. Some or all of the walls 80 include one or more heaters 82 for heating the particulate material on the support 78. The heaters 82 may be controlled by the controller 13 in response to a plurality of sensors measuring the temperature of the particulate material on the support 78.

It should be appreciated that while in FIG. 14, the plurality of walls 80 are arranged vertically, the plurality of walls 80 may have different orientations in other embodiments.

The support 78 provides an advantage in that the plurality of walls 80 may enable the segmentation of a large part bed into a series of thermally controllable smaller part beds. The internal part bed walls 80 are able to be moved to different locations to create different sizes of part beds. When moved, the internal part bed walls 80 lock into power sockets (not illustrated) to enable the heaters 82 within the walls to be used. The support 78 may also provide an advantage in that it may enable different particulate materials to be processed at once in different segments of the support 78. Furthermore, use of the support 78 may increase the throughput of the apparatus 11 without incurring the thermal challenges of controlling a relatively large support.

FIGS. 15A, 15B, 15C and 15D illustrate schematic side view diagrams of devices 84 for providing radiation absorbent material according to various embodiments of the invention. The devices 84 may be used in any sintering apparatus that uses radiation absorbent material to sinter particulate material.

With reference to FIG. 15A, the device $84_1$ includes a first roller 86, a first print head 88, a first source of radiation 90 and a housing 92 in which the first roller 86, the first print head 88 and the first source of radiation 90 are at least partially housed and/or connected. The first print head 88 is positioned between the first roller 86 and the first source of radiation 90. The controller 13 is configured to control the position and movement of the device $84_1$ relative to the deposited particulate material on the part bed via one or more motors.

The first roller 86 is arranged to distribute particulate material on a part bed so that the particulate material forms a substantially level surface. The first print head 88 is configured to provide a first radiation absorbent material and may include an associated thermal control device for controlling the temperature of the radiation absorbent material. The first source of radiation 90 may be any suitable source of radiation and may be configured to function as the heater described above in relation to FIGS. 9 and 10 and also the source of radiation that provides radiation for sintering the particulate material. In various embodiments, the first source of radiation 90 may include a reflection device 93 that defines an elliptical configuration and is configured to reflect radiation from the first source of radiation 90 in a desired pattern.

With reference to FIG. 15B, the device 84$_2$ is similar to the device 84$_1$ illustrated in FIG. 15A and where the features are similar, the same reference numerals are used. The device 84$_2$ differs from the device 84$_1$ in that it further comprises a second source of radiation 94 positioned adjacent the first roller 86 on the opposite side to the first print head 88.

In some embodiments, the first source of radiation 90 is configured to provide radiation for sintering and the second source of radiation 94 is configured to function as a heater and pre-heat particulate material. In other embodiments, the second source of radiation 94 may also be configured to provide radiation for sintering in addition to pre-heating. In still further embodiments, the first and second sources of radiation 90, 94 may both be configured to function as heaters and pre-heat particulate material. This may enable the apparatus 11 to have greater control of the temperature of the particulate material on the part bed.

With reference to FIG. 15C, the device 84$_3$ is similar to the device 84$_2$ illustrated in FIG. 15B and where the features are similar, the same reference numerals are used. The device 84$_3$ differs from the device 84$_2$ in that it further comprises a second print head 96 positioned between the second source of radiation 94 and the first roller 86. The second print head 96 may be configured to provide a second radiation absorbent material which is different to the first radiation absorbent material or may be configured to also provide the first radiation absorbent material.

Figure 15D:
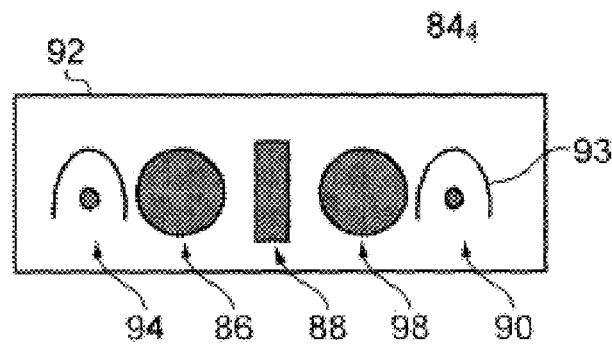

With reference to FIG. 15D, the device 84$_4$ is similar to the device 84$_2$ illustrated in FIG. 15B and where the features are similar, the same reference numerals are used. The device 84$_4$ differs from the device 84$_2$ in that it further comprises a second roller 98 positioned between the first source of radiation 90 and the first print head 88.

The devices 84$_3$ and 84$_4$ may provide an advantage in that they may enable radiation absorbent material to be provided on the layer of particulate material when the devices are moving on their outbound and inbound strokes (i.e. they may provide radiation absorbent material when travelling both left and right). In particular, the device 84$_4$ may be advantageous in that it may allow deposition of particulate material followed by immediate printing followed by immediate sintering from left to right and from right to left while only using one print head. Since print heads are relatively expensive, the device 84$_4$ may be relatively cheap since it comprises a single print head.

The devices 84 may also provide an advantage in that the housing 92 is arranged to allow users to interchange parts (e.g. the first roller 86, the first print head 88, the first source of radiation 90, the second source of radiation 94, the second print head 96 and the second roller 98) such that the sequence of processing steps can also be changed. This may allow users flexibility in tuning the process according to different needs such as use of different particulate materials. Interchanging of parts may be achieved by providing fixtures or other means of securing the components in a variety of arrangements within the housing 92.

Figure 16A:
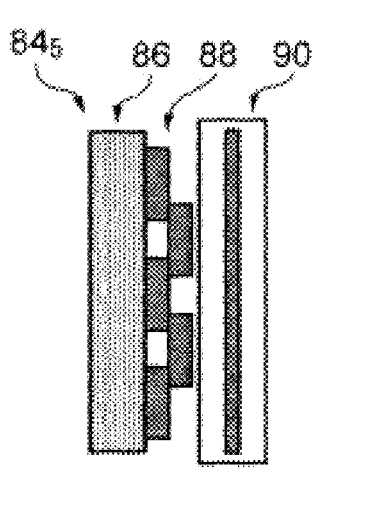
FIGS. 16A, 16B, 16C illustrate schematic plan view diagrams of devices for providing radiation absorbent material according to various embodiments of the invention.
Figure 16B:
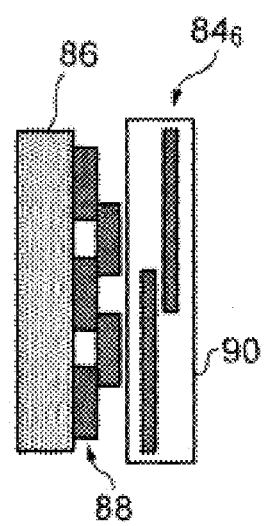
Figure 16C:
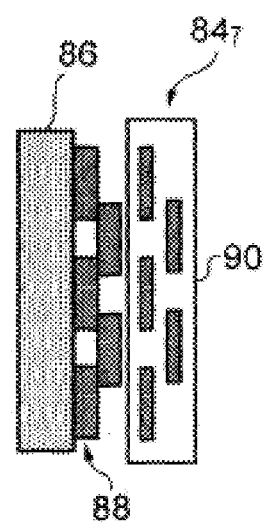

FIGS. 16A, 16B, 16C illustrate schematic plan view diagrams of devices 84 for providing radiation absorbent material according to various embodiments of the invention.

With reference to FIG. 16A, the device 84$_5$ is similar to the device 84$_1$ and where the features are similar, the same reference numerals are used. The device 84$_5$ differs from the device 84$_1$ in that the first print head 88 comprises a plurality of print heads that extend parallel to the first roller 86. The plurality of print heads are arranged in two vertical columns and a space is provided between at least some of the print heads in each column. The first source of radiation 90 comprises a single elongate lamp that is oriented parallel to the first roller 86.

With reference to FIG. 16B, the device 84$_6$ is similar to the device 84$_5$ and where the features are similar, the same reference numerals are used. The device 84$_6$ differs from the device 84$_5$ in that the first source of radiation 90 comprises two elongate lamps that arranged as two vertical columns and are offset relative to one another so that they overlap one another along only a portion of their lengths. The lamps may be arranged such that they overlap in a region at the end of each lamp where the emitted powder is reduced, such that in combination the two lamps provide a more even emission of power than a single lamp with power drop-off near its ends.

With reference to FIG. 16C, the device 84$_7$ is similar to the devices 84$_5$ and 84$_6$ and where the features are similar, the same reference numerals are used. The device 84$_7$ differs from the devices 84$_5$ and 84$_6$ in that the first source of radiation 90 comprises a plurality of elongate lamps that arranged in two vertical columns and a space is provided between at least some of the elongate lamps in each column.

Figure 17A:
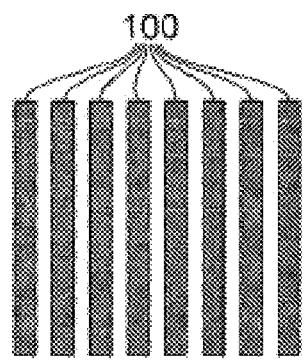
FIGS. 17A and 17B illustrate schematic plan view diagrams of sources of radiation according to various embodiments of the invention.
Figure 17B:
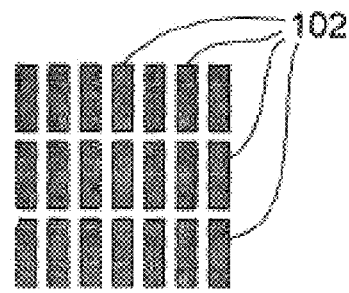

FIGS. 17A and 17B illustrate schematic plan view diagrams of sources of radiation 12, 90, 94 according to various embodiments of the invention. The sources of radiation may be used in any sintering apparatus and may also be used in any of the devices 84 illustrated in FIGS. 15A, 15B, 15C, 15D, 16A, 16B and 16C.

With reference to FIG. 17A, the source of radiation comprises a plurality of elongate electromagnetic radiation emitters 100 that are arranged so that they are oriented parallel to one another and overlap one another along substantially all of their lengths. Some or all of the elongate electromagnetic radiation emitters 100 may be individually controlled by the controller 13 and may be used to pre-heat particulate material and/or to provide radiation to sinter particulate material.

With reference to FIG. 17B, the source of radiation comprises a plurality of electromagnetic radiation emitters 102 that are arranged in a matrix having seven columns and three rows (it should be appreciated that the source of radiation may have any number of columns and rows in other embodiments). Some or all of the electromagnetic radiation emitters 102 may be individually controlled by the controller 13 and may be used to pre-heat particulate material and/or to provide radiation to sinter particulate material.

The sources of radiation illustrated in FIGS. 17A and 17B may provide an advantage in that they may allow for individual control of sintering energy applied in different areas of the part bed if controlled by thermal measurements from a sensor (such as a thermal imaging camera or a plurality of thermal measuring devices such as pyrometers or thermocouples).

In various embodiments, a variety of non-laser based Electro-Magnetic-Radiation (EMR) emitting devices may be used in the source of radiation. Each EMR device may possess a similar or significantly different peak spectral emission (i.e. they may have a similar or significantly different peak wavelength). Based on spectral emission, each EMR emitting device may be selected to either sinter (directly, or in-directly) different particulate materials within the part bed or to heat any deposited material(s)/particulate material with the feed(s) and part bed(s). Multiple EMR emitting devices can be used within the same apparatus. Selection of more than one of device thus enables sintering and/or heating of more than one type of particulate material/radiation absorbent material/deposited material.

In various embodiments, the source of radiation may include one or more filters for reducing and focusing the EMR energy to a desired spectral emission/energy density. A range of length EMR emitters may be used to create an array (single or multiple lines) that are individually controlled to sinter or heat specific regions or materials within the powder bed.

The utilisation of printing devices within a sintering apparatus enables selected and accurate deposition of a radiation absorbent material onto a part bed. The presence of such printing devices within the process also enables the deposition of other radiation absorbent materials or alternatively, other materials to be deposited within the printed region. Utilisation of such printing devices therefore enables the selected, precise deposition of secondary materials.

For example, a secondary print-head (as in FIG. 15C) may be configured to deposit a secondary radiation absorbent material to sinter different areas within the part bed.

By way of another example, a secondary print-head may be configured to deposit a secondary material which does not significantly enhance sintering with the part layer, but changes the local properties within the printed region. Such materials could provide additional properties to sintered parts such as fire retardancy, UV protection, a change in the visual colour of parts or improvement of mechanical properties through the addition of fillers. For fire retardency, the addition of flame retardants include compounds of chlorine, bromine and phosphorous, Alumina trihydrate, hydrated magnesium, sulphate and Boron. For UV protection, the materials include carbon black, metal oxides. For fillers, the materials include wood flour, silica flour, clay, powdered mica, short fibres of cellulose, glass, carbon black, graphite, talc, metal oxides and asbestos. For colorants, the materials include organic (dyes) or inorganic (pigments) colorants. The advantage of this approach is that it is only the material that forms the part that will contain the desirable added material, this can save money when compared with adding such additive(s) to all of the material in the machine. It also means that standard particulate feed material can be flexibly modified build by build or even part by part or even locally in subsections of a part.

In embodiments where a print-head is used, such additional materials may have to be nano-scale to enable projection from print head orifices. In these embodiments, additional fluid (Solvents, resins, pigments, dyes, petroleum distillates (hydrocarbons), alcohols, oils, plasticisers, waxes, photo initiators) materials may be combined with the additives to manufacture a jet-able fluid. Such supporting fluids/materials could be designed to either remain within the 3D part once printed or evaporate leaving only the desired additive in the selected position. The evaporation may be either naturally occurring due to the localised heat, or forced through exposure to a heating device.

In various embodiments, additional materials may be added using an alternative deposition device such as a hopper which may be controlled by the controller 13 to move across the part bed depositing material in prescribed regions of a part. Use of a hopper device may enable deposition of materials of a larger size (greater than nano scale) and also negate the need for any additional fluid carriers.

The inventors of the present application have determined that the visual colour of radiation absorbent material is not significant to the resultant mechanical properties of the manufactured three dimensional part. Consequently, radiation absorbent materials other than carbon black may be used in the sintering process and it is therefore possible to manufacture white parts on the apparatus 11. Coloured parts (red, green, blue) may be manufactured on the apparatus 11 through the combination of infra-red absorbent pigments with coloured (e.g. red, green and blue) pigments or dyes. The pigments may be provided in separate radiation absorbent materials, may be combined within the same radiation absorbent material or may not be in a radiation absorbent material at all.

A coloured three dimensional part may also be manufactured by using a series of coloured particulate materials (since the visual colour of the particulate material does not necessarily significantly increase the absorption of infra red energy by the particulate material).

The blocks illustrated in FIGS. 9 to 13 may represent steps in a method and/or sections of code in the computer program $13_3$. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, although the use of infra-red radiation is described, radiation other than infra-red may be used, provided that it is able to elevate the particulate material to a temperature at which it combines by sintering. The source of radiation may be of any suitable type, for example, LEDs, a scanning laser or a halogen source. The particulate material that is combined by the above described embodiments may be any suitable material, such as a metal, ceramic etc. A device other than a motor M may be used to move particulate material from the supply tank 40 to the combination device 42. The combination device 42 may be of a different configuration to that shown. Any number of different types of particulate material may be provided in a layer 10. Alternatively, different types of particulate material may be provided in adjacent layers. Reflective material 18 may be deposited onto a lower surface of the substrate 16 rather than an upper surface, as illustrated. Different materials may be used for the reflective material 18 and the substrate 16. Any suitable material may be used for the radiation absorbent material 50. For example, a liquid suspension and/or a gas, for example carbon dioxide, could be employed instead of a powder material. The digital mirror device described in relation to FIG. 4 could be replaced by a series of diffractive optics, one for each layer.

Where the term "sintering" is used it should be noted that this includes full melting of particulate material.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of selectively combining particulate material, comprising:
   (i) using a particulate material deposition device to provide a layer of particulate material to a part bed;
   (ii) providing radiation to sinter a portion of the material of the layer;
   (iii) using the particulate material deposition device to provide an overlying further layer of particulate material overlying the previously provided layer of particulate material including the previously sintered portion of material;
   (iv) providing radiation to sinter a further portion of the material within the overlying further layer and to sinter said further portion with the previously sintered portion of material in the prior layer;
   (v) successively repeating blocks (iii) and (iv) to form a three-dimensional object;
   wherein at least some of the layers of particulate material are pre-heated with a radiant heater prior to and independent from sintering a portion of the material of the respective layer, the radiant heater being separate from and positioned adjacent a roller configured as the particulate material deposition device and configured to traverse above the part bed surface following the particulate material deposition device in order to transfer heat, via radiation, to the deposited particulate material, wherein the pre-heating of the at least some of the layers of the particulate material with the radiant heater is controlled to prevent underlying sintered material from cooling to a temperature at which it curls.

2. A method as claimed in claim 1, wherein the radiant heater is configured to move within 100 mm of the particulate material.

3. A method as claimed in claim 1, wherein the radiant heater emits a range of wavelengths with a peak wavelength which is different to that of a radiation source for providing the radiation that initiates sintering.

4. A method as claimed in claim 1, further comprising:
   varying the absorption of provided radiation in block (ii) across a selected surface portion of the layer to sinter a portion of the material of the layer; and
   varying the absorption of provided radiation in block (iv) across a selected surface portion of the overlying further layer to sinter a further portion of the material within the overlying further layer and to sinter said further portion with the previously sintered portion of material in the previously provided layer.

5. A method as claimed in claim 4, wherein the variation of radiation absorption is obtained by providing an amount of radiation absorbent material over the selected surface portion of the layer and the overlying further layer respectively.

6. A method as claimed in claim 5, wherein the radiation absorption material is provided by a print head, the print head including an associated thermal control device for controlling the temperature of the radiation absorbent material.

7. A method as claimed in claim 5, wherein an apparatus configured to selectively combine particulate material comprises a housing that houses: a first print head for providing a first radiation absorbent material of the radiation absorbent material, the roller, and a first source of radiation configured to provide the radiation of block (ii) and block (iv).

8. A method as claimed in claim 7, wherein the apparatus configured to selectively combine particulate material further comprises a second source of radiation configured as the radiant heater, wherein the second source of radiation is housed within the housing.

9. A non-transitory computer-readable storage medium encoded with instructions that, when performed by a processor, cause performance of the method of claim 1.

10. A method as claimed in claim 1, wherein a temperature of the particulate material is measured and the radiant heater is controlled to pre-heat the at least some of the layers of particulate material in dependence on the measured temperature.

11. A method as claimed in claim 10, wherein:
    the measured temperature of the particulate material is the temperature of particulate material comprised in the previously provided layer of the particulate material, forming at least part of the surface of the particulate material provided to the part bed; and
    wherein the radiant heater is controlled to pre-heat the overlying further layer of particulate material, forming at least part of the surface of the particulate material provided to the part bed, in dependence upon the measured temperature of the previously provided layer of particulate material.

* * * * *